Figure 1:
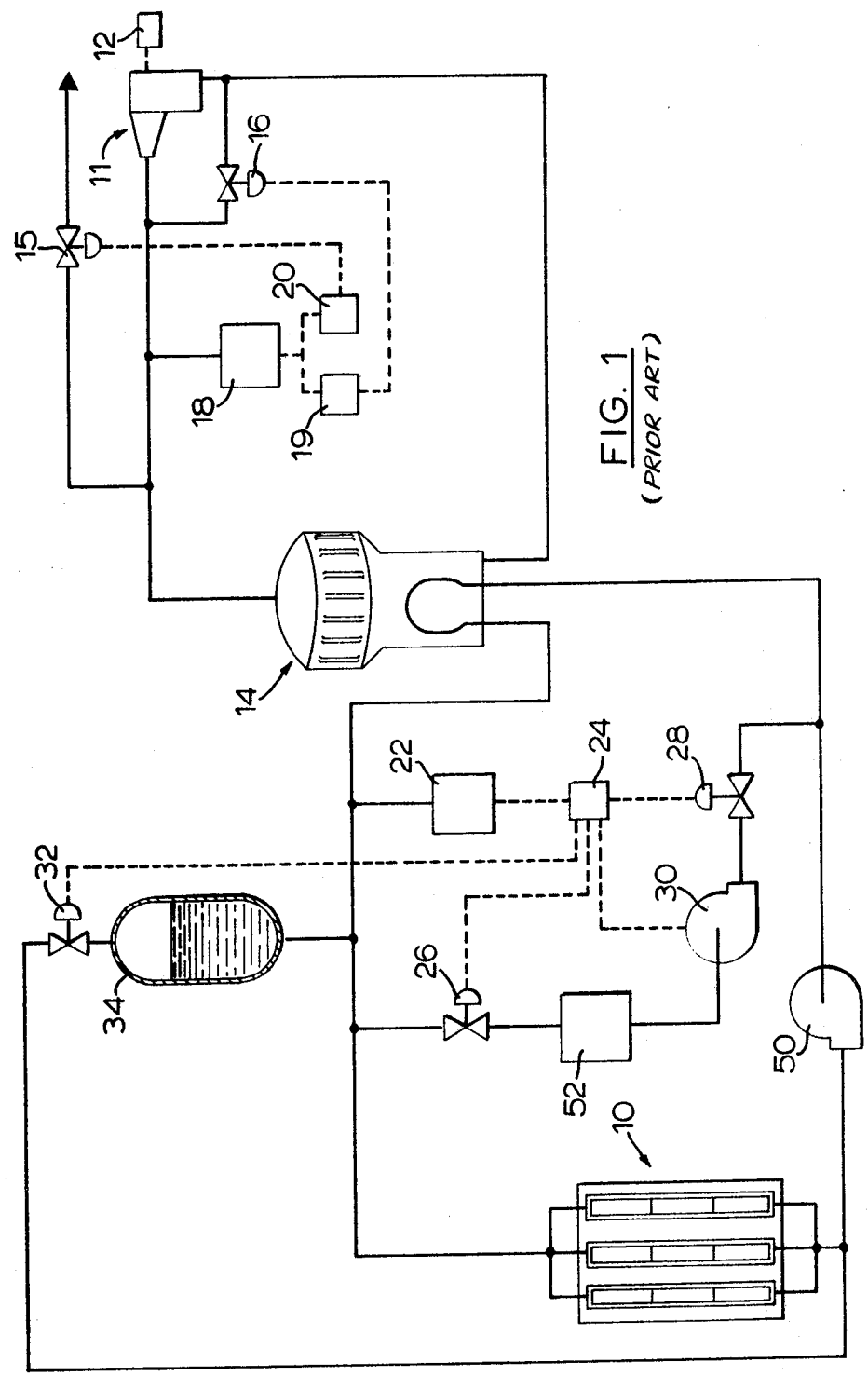

United States Patent
Klingbeil et al.

[15] 3,660,229
[45] May 2, 1972

[54] REACTOR CONTROL SYSTEM

[72] Inventors: Herbert N. Klingbeil; Walter W. Cliffe; William A. Castell, all of Peterborough, Ontario, Canada

[73] Assignee: Canadian General Electric Company Limited

[22] Filed: Feb. 7, 1969

[21] Appl. No.: 797,447

[52] U.S. Cl. .................................. 176/20, 176/55, 176/65, 60/108
[51] Int. Cl. ........................................................... G21c 7/00
[58] Field of Search .............................. 176/20, 55, 65, 24, 60

[56] References Cited

UNITED STATES PATENTS

| 3,242,053 | 3/1966 | Sanders et al. | 196/65 X |
| 3,255,084 | 6/1966 | Doroszlai | 176/60 X |

Primary Examiner—Reuben Epstein
Attorney—Ivor J. James, Jr., Samuel E. Turner, John R. Duncan, Frank L. Neuhauser, Oscar B. Waddell and Melvin M. Goldenberg

[57] ABSTRACT

A method of controlling the pressure in the primary circuit of a nuclear power plant in which the fluid in the primary circuit is liquid and the circuit has a surge tank and spray means for condensing vapors in the tank. The pressure in the primary circuit is controlled by controlling the spray means in response to the pressure in the secondary circuit.

8 Claims, 2 Drawing Figures

INVENTOR.
WALTER W. CLIFFE
WILLIAM A. CASTELL
HERBERT N. KLINGBEIL
BY: Samuel E. Turner
ATTORNEY

REACTOR CONTROL SYSTEM

This invention is directed to a method of controlling a power plant, and to a nuclear power plant for carrying out the method. In particular the invention is directed to a method of controlling the pressure generated in a nuclear thermal power plant having primary and secondary thermal fluid circuits.

In the operation of nuclear reactors of the type having a primary coolant circuit removing heat from a nuclear reactor, and a secondary coolant circuit obtaining heat from the primary coolant for delivery to a prime mover such as a steam turbine, problems in system control arise owing to the thermal and mass inertia of the system. It has been prior practice to utilize pressure sensors in the primary coolant circuit to control the characteristics of the circuit in an attempt to prevent the circuit pressure exceeding predetermined safe values. Owing to the thermal inertia of the primary and secondary fluid systems these prior arrangements have not provided the desired rapidity of response, so that the primary system is subject to undesired pressure swings, thus necessitating over-design in the system components, which is of particular criticality within the reactor itself.

The present invention provides the method of controlling a power plant having a primary fluid thermal circuit operating in a predetermined safe first pressure range to derive useful heat energy from a heat source such as a nuclear reactor, and a secondary fluid thermal circuit in heat interchange relation with the primary fluid circuit, to provide pressurized vapor or steam to a prime mover of the power plant working against a load, including the step of monitoring the pressure of the secondary fluid at a point in the secondary circuit to determine the rate of change of the pressure resulting from changes in the load on the prime mover, and modifying the pressure of the primary fluid in response to the monitored rate of change of pressure in the secondary fluid, so that the maximum pressure of the primary fluid does not exceed the predetermined safe pressure. Thus in the case of an atomic reactor utilizing liquid or boiling coolant in conjunction with a steam generator in which light water is converted to steam for use in a steam turbine driving a generator, the rate of pressure change in the steam supplied to the turbine is monitored, to provide a controlling signal to the coolant circuit of the reactor, the primary circuit.

In the event of load rejection at a greater rate than the usual transient rate of load rejection, such as when the generator is tripped from the bus bars while at full load, the pressure upstream of the turbine inlet control valves rises very rapidly. In prior practice, when the turbine inlet pressure exceeds a preset value this condition has been utilized to open a steam blow off valve, and/or to pass steam in bypass relation around the turbine, so as to diminish the possibility that the turbine will run away, while maintaining this steam pressure in the circuit at a safe level. The increase in steam pressure causes an increase in primary fluid temperature resulting in a thermal expansion (swelling) of this fluid and a rise in pressure.

According to the present invention, in the foregoing circumstance an output signal indicative of the rate of stream pressure rise is passed to the controller of the primary coolant circuit, to effect such controls as the passage of coolant water to the surge tank of the system to produce condensation of vapor within the surge tank and thereby reduce the system pressure, and/or together with the step of opening a coolant discharge or bleed to permit the passage of coolant from the primary system in proportion to the anticipated thermal expansion which is a function of steam pressure rate of rise. By this method the pressure increase in the primary heat transport fluid containment system is greatly reduced, thus permitting the lowering of maximum containment component pressure rating, resulting in the use of reduced fuel sheath thickness and coolant tube thickness, with a resultant decrease in neutron absorption and a corresponding increase in reactor efficiency.

Figure 2:
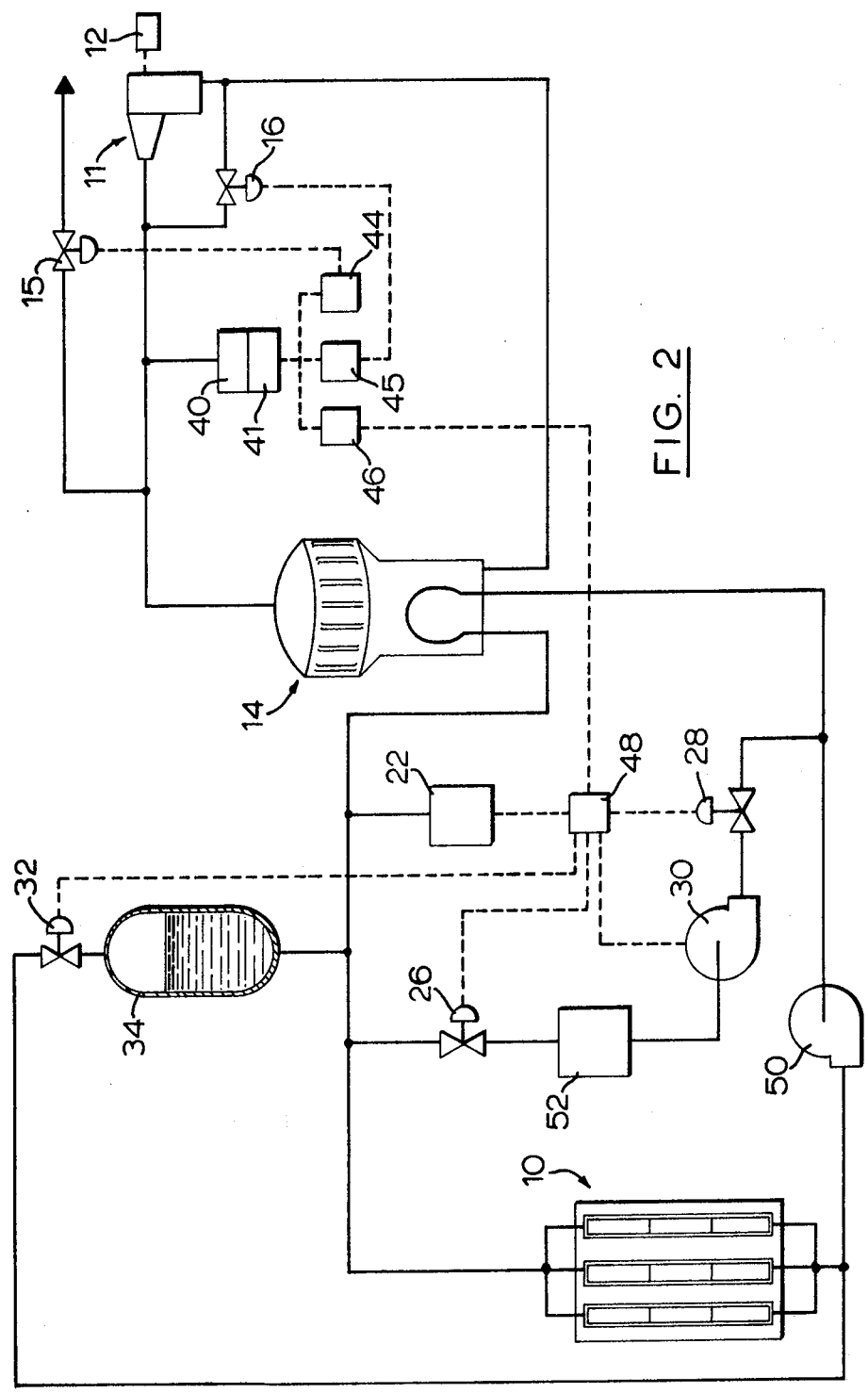

Certain embodiments of the prior art and of the present invention are illustrated, reference being had to the accompanying drawings wherein;

FIG. 1 is a diagrammatic illustration of a circuit according to the prior art; and FIG. 2 shows the control circuit of a nuclear reactor power plant for carrying out the present invention.

Referring first to FIG. 1, a nuclear reactor 10 having a first fluid coolant circuit is used to generate steam to drive the turbine 11 mechanically coupled to the generator 12.

In this prior arrangement, should the turbine suddenly shed load, the pressure of the secondary circuit is controlled by a steam blow off valve 15 and a steam by-pass valve 16. The operation of the by-pass valves 15, 16 is brought about by a pressure transducer 18 arranged in controlling relation with a first controller 19 and a second controller 20 in respective controlling relation with the valves 16, 15.

The primary circuit control illustrated in this prior arrangement includes a pressure sensor transmitter 22 providing an output to a controller 24 in controlling relation with a bleed valve 26, a feed valve 28, a pump station 30 with variable capacity, and the spray control valve 32 of the surge tank 34. In operation, upon the occurrence of load rejection in the secondary circuit connected with a steam turbine 11, the temperature and pressure in that secondary circuit increase, thereby effectively raising the temperature and the pressure of primary fluid passing through the steam generator 14. This consequent rise of primary pressure, being sensed by the sensor 22, produces opening of the spray control valve 32, and opening of the bleed valve 26 so that the increased fluid volume resulting from the fluid thermal expansion is effectively removed, thus limiting primary pressure rise. However, owing to the inertia of this prior system the rate of response is such that there is considerable likelihood of large pressure transients within the primary circuit.

It will be understood that the foregoing description refers to the worst possible case, that of total load rejection, but the system can operate with varying degrees of success for less arduous operating conditions.

Referring to the embodiment for carrying out the presently disclosed method, illustrated in FIG. 2, the secondary fluid circuit of the power plant supplying steam from the generator 14 to the turbine 11 is provided with a pressure transducer 40 coupled with a rate instrument such as that Trademarked "-Bailey" meter or digital type control, to provide an output proportional to the rate of pressure change. This output then passes to a series of controllers 44, 45, 46, the first two of these controlling a turbine by-pass valve 16 and the steam blow off valve 15, respectively. The third controller 46 is connected in turn to the primary fluid circuit, being connected to a controller 48. The controller 48 also receives an input from a pressure sensor transmitter 22, as a function of the primary circuit pressure. The outputs from the controller 48 are shown connected with the control valves 28, 26 and 32 and with pump station 30 respectively.

In operation the pressure in the secondary circuit of steam passing to the turbine 11 is sensed by the pressure transducer 40, which with the rate instrument 41 provides a pressure rate output signal to the controllers 44, 45 and 46. The secondary circuit controllers 44, 45 serve to control the over pressure in the secondary circuit. The controller 46 provides a signal to the controller 48 of the primary fluid circuit. In the case of a high rate of pressure increase such as that caused by rejection of full load from the generator 12 and the shutting down of the turbine 11, the increase in the secondary circuit pressure is sensed immediately and causes the initiation through the controller 48 of the operation of the spray control valve 32 in surge tank 34, so as to initiate reduction of pressure in the reactor coolant circuit, together with control of operation of the valves 26 and 28, and the pump station 30.

Other elements illustrated in FIGS. 1 and 2 and not specifically described comprise the main circulation pump 50 and a clean up and degassing system and reservoir 52.

In addition to reducing peak pressures experienced in the primary fluid circuit, the present invention provides the advantage that the charging pump station 30 is made ready on occurrence of high pressure rates in the secondary fluid circuit, so that the station pumps are up to operating speed seconds before the primary heat transport system requires the extra make-up fluid to control pressure, during the pressure reversal which may occur in the primary system.

The embodiments of the invention in which an exclusive property or privilege is claimed are defined as follows:

1. The method of controlling a power plant having a primary liquid fluid thermal circuit operating in a predetermined safe first pressure range to derive useful heat energy from a heat source including a surge chamber partly filled with vaporized coolant and spray means for spraying liquid coolant into said surge chamber to condense a part of said vaporized coolant for lowering the pressure in said primary circuit, and a secondary fluid thermal circuit in heat interchange relation with said primary fluid circuit to provide pressurized vapor to a prime mover of the power plant working against a load, including the steps of monitoring the pressure of said secondary fluid at a point in said secondary circuit to determine the rate of change of said pressure resulting from changes in the load on said prime mover, and modifying the pressure of said primary fluid by controlling said spray means in response to said monitored rate of change of pressure in said secondary fluid, whereby the maximum pressure of said primary fluid does not exceed said predetermined safe pressure.

2. The method as claimed in claim 1 wherein said pressure is monitored adjacent the inlet to said prime mover.

3. The method as claimed in claim 1 wherein said power plant comprises a nuclear reactor, said primary fluid being liquid coolant circulating in cooling relation through said reactor.

4. The method as claimed in claim 3 wherein said primary coolant is heavy water, and said secondary fluid is light water in liquid and vapor phase.

5. In the operation of a primary liquid fluid thermal circuit in heat exchange relation with a secondary fluid thermal circuit, said primary circuit including a surge chamber partly filled with vaporized coolant and spray means for spraying liquid coolant into said surge chamber to condense a part of said vaporized coolant for lowering the pressure in said primary circuit, the method of obtaining a pressure rate of change signal from the secondary fluid thermal circuit for use in the control of the pressure of the primary fluid circuit, comprising the steps of measuring the secondary fluid pressure using a transducer to provide an output signal, passing said signal rate instrument and obtaining a rate of pressure change signal, and utilizing said rate signal to control said spray means in said primary system said rate signal to control primary system pressure.

6. The method as claimed in claim 5 wherein said primary fluid circuit comprises a coolant circuit for a nuclear reactor, said secondary fluid thermal circuit providing steam to a steam turbine.

7. The method as claimed in claim 5 wherein said secondary pressure rate signal is used to initiate a change in pumping capacity of a charging pump means associated with the primary system.

8. A nuclear power plant having a nuclear reactor, a primary fluid circuit for circulating a liquid coolant through the reactor, reactor pressure increasing and decreasing means including a surge chamber partly filled with vaporized coolant and spray means for spraying liquid coolant into said surge chamber to condense a part of said vaporized coolant for lowering the pressure in said primary circuit, a secondary fluid circuit in heat exchange relation with said primary fluid to provide vapor to a turbine, a pressure transducer to sense the pressure of said secondary fluid, signal rate means connected with said pressure transducer having an output signal proportional to the rate of pressure change, and means for applying said rate output signal to said spray means for controlling the pressure of said primary fluid circuit in accordance with the pressure condition of said secondary fluid circuit.

* * * * *

UNITED STATES PATENT OFFICE
CERTIFICATE OF CORRECTION

Patent No. 3,660,229　　　　　　　　Dated　2 May 1972

Inventor(s) Herbert N. Klingbeil, Walter W. Cliffe, William A. Castell

It is certified that error appears in the above-identified patent and that said Letters Patent are hereby corrected as shown below:

Column 4, lines 11 and 12, delete "said rate signal to control primary system pressure".

Signed and sealed this 25th day of July 1972.

(SEAL)
Attest:

EDWARD M. FLETCHER, JR.　　　　ROBERT GOTTSCHALK
Attesting Officer　　　　　　　　Commissioner of Patents